United States Patent
Arvidsson et al.

(10) Patent No.: US 9,332,060 B2
(45) Date of Patent: May 3, 2016

(54) METHODS, SECURE ELEMENT, SERVER, COMPUTER PROGRAMS AND COMPUTER PROGRAM PRODUCTS FOR IMPROVED APPLICATION MANAGEMENT

(75) Inventors: Petter Arvidsson, Bromma (SE); Mattias Eld, Spånga (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 710 days.

(21) Appl. No.: 13/512,814

(22) PCT Filed: Dec. 4, 2009

(86) PCT No.: PCT/SE2009/051378
§ 371 (c)(1),
(2), (4) Date: Sep. 10, 2012

(87) PCT Pub. No.: WO2011/068448
PCT Pub. Date: Jun. 9, 2011

(65) Prior Publication Data
US 2013/0019323 A1    Jan. 17, 2013

(51) Int. Cl.
*H04L 29/08* (2006.01)
*G06F 21/77* (2013.01)
(Continued)

(52) U.S. Cl.
CPC ............ *H04L 67/10* (2013.01); *G06F 21/77* (2013.01); *G06Q 20/3278* (2013.01); *H04L 63/0492* (2013.01); *H04W 4/003* (2013.01); *H04W 12/06* (2013.01); *H04L 2209/56* (2013.01)

(58) Field of Classification Search
CPC .......... G06Q 20/3278; H04L 2209/56; H04W 4/008; G06F 21/77
USPC .......................................................... 726/3
See application file for complete search history.

(56) References Cited

U.S. PATENT DOCUMENTS 7,073,165 B2 *  7/2006  Hanson ................. G06F 9/4426
                                                   712/E9.083
8,229,354 B2 *  7/2012  Sklovsky ................ H04L 67/16
                                                   455/41.1

(Continued)

FOREIGN PATENT DOCUMENTS

EP    1798867 A2    6/2007
WO   2006095212 A1  9/2006
WO   2008071924 A2  6/2008

OTHER PUBLICATIONS

Near Field Communication Application Provisioning Framework; Andrea Martinez Mazo; Lulea University of Technology; Sep. 2009.*

(Continued)

*Primary Examiner* — James Turchen
(74) *Attorney, Agent, or Firm* — Patent Portfolio Builders, PLLC

(57) ABSTRACT

It presented a method, performed in a secure element, the secure element being arranged to enable user applications of the secure element to verify authenticity of incoming user application commands. The method comprises the steps of: receiving a command from a secure element reader for a user application on the secure element, the command comprising an application identifier of the user application; determining whether there is a matching user application in the secure element; invoking the matching user application; and establishing, when there is an absence of any matching user applications, a communication channel with a remote application manager server and sending an absent user application message to the application manager server indicating that the user application has been requested on the secure element. A corresponding secure element, method for an application manager server and application manager server are also presented.

5 Claims, 6 Drawing Sheets

(51) Int. Cl.
  *H04W 12/06* (2009.01)
  *G06Q 20/32* (2012.01)
  *H04L 29/06* (2006.01)
  *H04W 4/00* (2009.01)

(56) References Cited

U.S. PATENT DOCUMENTS

| | | | | |
|---|---|---|---|---|
| 8,249,654 | B1* | 8/2012 | Zhu | H04M 17/00 235/375 |
| 8,495,175 | B2* | 7/2013 | Corda | G06F 8/62 709/203 |
| 8,527,987 | B2* | 9/2013 | Johansson | G06F 8/61 455/41.1 |
| 8,538,332 | B2* | 9/2013 | Huomo | G06Q 20/045 235/451 |
| 8,725,122 | B2* | 5/2014 | Musfeldt | G06F 21/604 370/338 |
| 8,799,574 | B2* | 8/2014 | Corda | G06Q 20/045 711/115 |
| 2003/0046676 | A1* | 3/2003 | Cheng | G06F 8/62 717/173 |
| 2003/0177178 | A1* | 9/2003 | Jones | G06F 17/30067 709/203 |
| 2003/0204730 | A1 | 10/2003 | Barmettler et al. | |
| 2003/0236867 | A1 | 12/2003 | Natsuno et al. | |
| 2005/0184165 | A1 | 8/2005 | de Jong | |
| 2005/0222961 | A1* | 10/2005 | Staib | G06Q 20/327 705/64 |
| 2008/0167961 | A1* | 7/2008 | Wentker | G06Q 20/10 705/14.25 |
| 2009/0143104 | A1* | 6/2009 | Loh | G06Q 20/32 45/558 |
| 2009/0307140 | A1* | 12/2009 | Mardikar | G06Q 20/1085 705/71 |
| 2009/0307142 | A1* | 12/2009 | Mardikar | G06Q 20/1085 705/72 |
| 2009/0312011 | A1* | 12/2009 | Huomo | G06K 7/0008 455/426.1 |
| 2010/0029202 | A1* | 2/2010 | Jolivet | G06K 7/0008 455/41.1 |
| 2010/0049977 | A1* | 2/2010 | Kanemoto | G06F 21/445 713/169 |
| 2010/0323681 | A1* | 12/2010 | Corda | G06Q 20/223 455/419 |
| 2011/0113473 | A1* | 5/2011 | Corda | G06Q 20/32 726/3 |
| 2011/0239304 | A1* | 9/2011 | Saarisalo | G06F 21/57 726/26 |
| 2012/0042147 | A1* | 2/2012 | Duc | G06F 21/62 711/170 |

OTHER PUBLICATIONS

A Platform for Pervasive Infrastructures; Jakob Saros et al.; 2009 Third International Conference on Next Generation Mobile Applications, Services and Technologies; Sep. 2009.*

The Design ofNFC Based Applications; B. Benyo et al.; IEEE; 11th International Conference on Intelligent Engineering Systems; Jun. 29-Jul. 1, 2007.*

ETSI TS 102 124 V6.1.0 (Dec. 2004); Smart Cards; Transport Protocol for UICC based Applications; Stage 1 (Release 6); Dec. 2004.*

Steffens, E.-J. et al. "The SIM-based mobile wallet: A Convergent approach towards convenience and security in mobile transaction services". Deutche Telekom AG, 3rd International Conference on Intelligence in Next Generation Networks, 2009, Oct. 26, 2009.

Madlmayer, G. et al. "Managing an NFC Ecosystem". 7th International Conference on Mobile Business, 2008, ICMB '08, Jul. 7-8, 2008, pp. 95-101.

* cited by examiner methods, secure element, server, computer programs and computer program products for improved application management

FIELD OF INVENTION

The invention relates generally to application management in relation to a secure element.

BACKGROUND

Near Field Communication (NFC) is a technology enabling many different kinds of useful services. In particular, value based services have been discussed, such as payment, ticketing, physical access and coupons. NFC works by providing a portable secure element coupled to a user, which secure element can communicate with a secure element reader, e.g. for the services mentioned above.

The technology is useful when there is a secure element reader and a matching application on the secure element. However, there is no satisfactory solution in the prior art to what happens when a secure element reader attempts to interact with a secure element, when there is no matching application on the secure element.

Consequently, there is a need to improve the management of applications on secure elements in general, and in particular, to improve application management when there is no application on the secure element which matches a secure element reader trying to interact with the secure element.

SUMMARY

An object of the invention is to improve application management in relation to secure elements.

According to a first aspect of the invention, it is presented a method, performed in a secure element, the secure element being arranged to enable user applications of the secure element to verify authenticity of incoming user application commands, and the secure element being adapted to be comprised in a mobile communication terminal. The method comprises the steps of: receiving a command from a secure element reader for a user application on the secure element, the command comprising an application identifier of the user application; determining whether there is a matching user application in the secure element, wherein an identifier of any matching user application matches the application identifier; invoking, when there is a matching user application, the matching user application based on the received command; and establishing, when there is an absence of any matching user applications, a communication channel with a remote application manager server and sending an absent user application message to the application manager server indicating that the user application has been requested on the secure element, the absent user application message including an identifier of the absent user application and an identifier coupled to the mobile communication terminal.

This enables a convenient way of handling user applications being absent from the secure element. By delegating the handling to the application manager server, more options become available on how to handle the absent application, since the application manager server has more processing power, more storage and is not limited by battery life or small physical size.

The step of establishing a communication channel and sending the absent user application message may be executed by an internal application stored in the memory, wherein the internal application has an association with the application identifier. By associating the internal application with the application identifier, the secure element environment requires little or no modification to implement this solution.

The method may comprise the step of: receiving, when there is an absence of any matching user applications in the secure element, the user application from the application manager server, the received user application being sent from the application manager server in response to the absent application message, and invoking the received user application. This allows for an automated handling of absent user applications, which is beneficial for the user experience.

The method may comprise the step of receiving an application instance state comprising state data of the received application from when the received application was most recently executed in the secure element. By receiving the application instance state, variables particular applications can be re-instantiated upon loading, making a dynamic unloading and loading possible with a minimum of user disruption.

The step of establishing a communication channel may utilise Bearer Independent Protocol. The Bearer Independent Protocol is a proactive communication protocol and is particularly relevant when the Secure Element is a Universal Integrated Circuit Card (UICC).

A second aspect of the invention is a secure element arranged to enable user applications of the secure element to verify authenticity of incoming user application commands, wherein the secure element is adapted to be comprised in a mobile communication terminal. The secure element comprises: a receiver configured to receive a command from a secure element reader for a user application on the secure element, the command comprising an application identifier of the user application; a determiner arranged to determine whether there is a matching user application in the secure element, wherein an identifier of the matching user application matches the application identifier; an invoker arranged to invoke, when there is a matching user application, the matching user application based on the received command; and a transmitter arranged to establish, when there is an absence of any matching user applications, a communication channel with a remote application manager server and send an absent user application message to the application manager server indicating that the user application has been requested on the secure element, the absent user application message including an identifier of the absent user application and an identifier coupled to the mobile communication terminal.

The secure element may comprise a user application receiver arranged to receive an application instance state comprising state data of the received application from when the received application was most recently executed from being stored in the secure element.

The communication channel may be implemented using Bearer Independent Protocol.

A third aspect of the invention is a computer program comprising computer program code executable in a controller with access to a secure element being arranged to enable user applications of the secure element to verify authenticity of incoming user application commands, and the secure element being adapted to be comprised in a mobile communication terminal. The computer program code, when run on the controller, causes the controller to perform the steps of: receiving a command from a secure element reader for a user application on the secure element, the command comprising an application identifier of the user application; determining whether there is a matching user application in the secure element, wherein an identifier of the matching user application matches the application identifier; invoking, when there is a matching user application, the matching user application based on the received command; and establishing, when there is an absence of any matching user applications, a communication channel with a remote application manager server and sending an absent user application message to the application manager server indicating that the user application has been requested on the secure element, the absent user application message including an identifier of the absent user application and an identifier coupled to the mobile communication terminal.

A fourth aspect of the invention is a computer program product comprising a computer program according to the third aspect and a computer readable means on which the computer program is stored.

A fifth aspect of the invention is a method, performed in an application manager server. The method comprises the steps of: receiving a message indicating an absent user application from a secure element, the secure element being arranged to enable user applications of the secure element to verify authenticity of incoming user application commands, and the secure element being adapted to be comprised in a mobile communication terminal, the absent user application message indicating that a command was sent to access a user application being absent on the secure element; reading a configuration to determine how to handle absent user application for the user application; and retrieving, when the configuration for the user application indicates user application retrieval, the user application from a storage being accessible to the application manager server and sending the user application to the secure element.

The method may comprise the step of: retrieving an application instance state comprising state data of the user application from when the user application was most recently executed from being stored in the secure element.

The method may comprise the step of: sending, when the configuration for the user application indicates to inform a service provider server, an absent user application message to a service provider server, wherein the service provider server is connected to a secure element reader which has requested access to the user application on the secure element. By sending information to the service provider server that an absent user application has been requested, the service provider is enabled to handle the event.

The method may comprise the step of: receiving a configuration message from the service provider server indicating how an absent user application message is to be handled by the application manager server. In other words, the service provider can thus configure how the user applications associated with the service provider are to be handled. This allows convenient differentiation between how different service providers handle absent user applications.

A sixth aspect of the invention is an application manager server comprising: a receiver configured to receive an absent user application message from a secure element, the secure element being arranged to enable user applications of the secure element to verify authenticity of incoming user application commands, and the secure element being adapted to be comprised in a mobile communication terminal, the absent user application message indicating that a command was sent to access a user application being absent on the secure element; a transmitter; a controller configured to read a configuration to determine how to handle absent user application for the user application; and wherein the controller is configured to retrieve, when the configuration for the user application indicates application retrieval, the user application from storage and send the user application to the secure element using the transmitter.

The application manager server may comprise an application instance retriever arranged to retrieve an application instance state comprising state data of the user application from when the user application was most recently executed from being stored in the secure element.

The transmitter may be arranged to, when the configuration for the user application indicates to inform a service provider server, send an absent user application message to a service provider server, wherein the service provider server is connected to a secure element reader which has requested access to the user application on the secure element.

The receiver can be arranged to receive a configuration message from the service provider server indicating how an absent user application message is to be handled by the application manager server.

A seventh aspect of the invention is a computer program for an application manager server. The computer program comprises computer program code which, when run on the application manager server, causes the application manager server to perform the steps of: receiving an absent user application message from a secure element, the secure element being arranged to enable user applications of the secure element to verify authenticity of incoming user application commands, and the secure element being adapted to be comprised in a mobile communication terminal, the absent user application message indicating that a command was sent to access a user application being absent on the secure element; reading a configuration to determine how to handle absent user application for the user application; and retrieving, when the configuration for the user application indicates application retrieval, the user application from storage and sending the user application to the secure element.

An eighth aspect of the invention is a computer program product comprising a computer program according to the seventh aspect and a computer readable means on which the computer program is stored.

A ninth aspect of the invention is a system. The system comprises a secure element and an application manager server. The secure element is arranged to enable user applications of the secure element to verify authenticity of incoming user application commands, wherein the secure element is adapted to be comprised in a mobile communication terminal. The secure element comprises: a receiver configured to receive a command from a secure element reader for a user application on the secure element, the command comprising an application identifier of the user application; a determiner arranged to determine whether there is a matching user application in the secure element, wherein an identifier of the matching user application matches the application identifier; an invoker arranged to invoke, when there is a matching user application, the matching user application based on the received command; and a transmitter arranged to establish, when there is an absence of any matching user applications, a communication channel with a remote application manager server and send an absent user application message to the application manager server indicating that the user application has been requested on the secure element, the absent user application message including an identifier of the absent user application and an identifier coupled to the mobile communication terminal. The application manager server comprises: a receiver configured to receive the absent user application message from the secure element; a transmitter; a controller configured to read a configuration to determine how to handle absent user application for the user application; and wherein the controller is configured to retrieve, when the configuration for the user application indicates user application retrieval, the user application from storage and send the user application to the secure element using the transmitter.

It is to be noted that any feature of the first, second, third and fourth aspects may, where appropriate, be applied to any other aspects of these aspects. Analogously any feature of the fifth, sixth, seventh, and eighth aspects may, where appropriate, be applied to any other aspects of these aspects Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
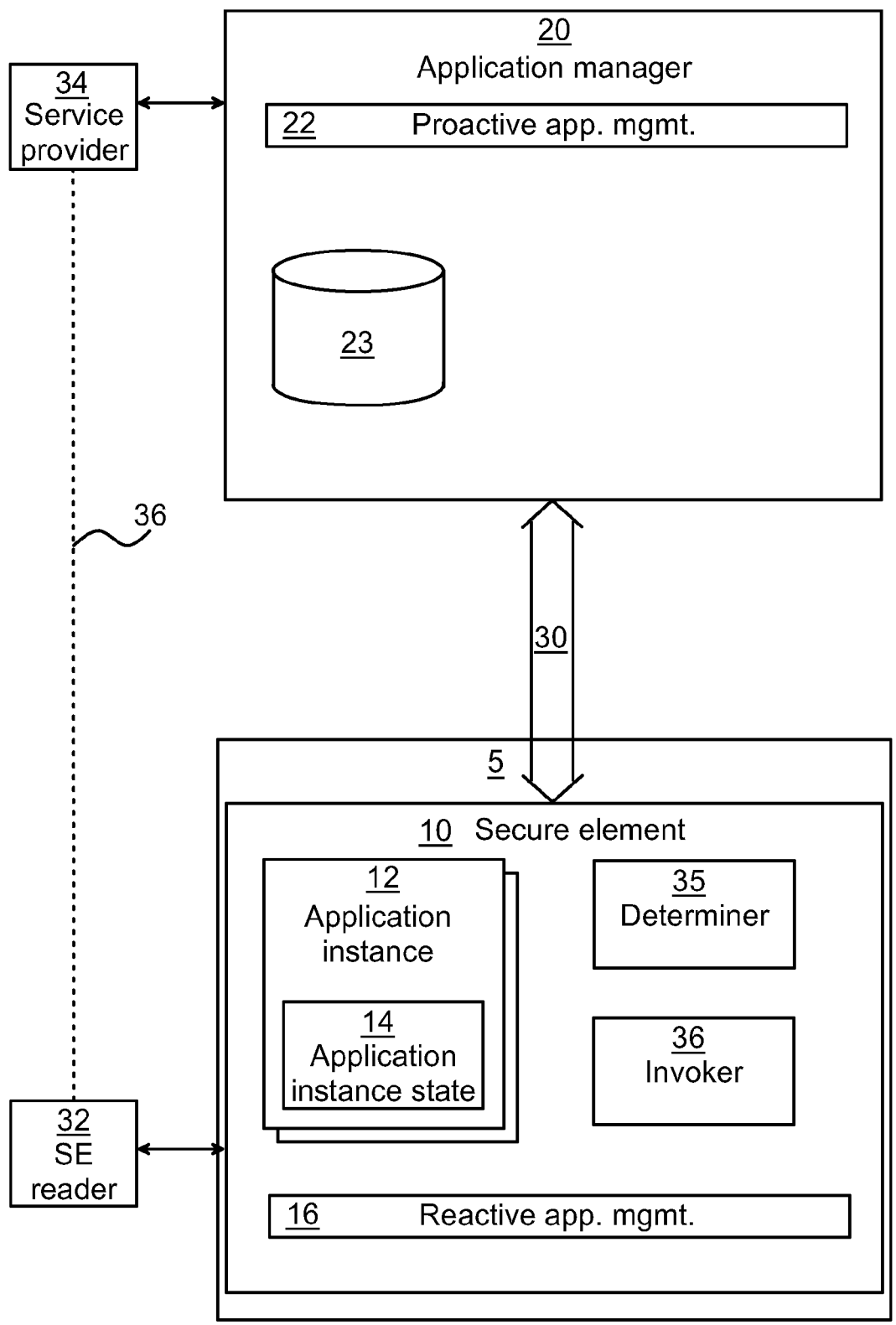
FIG. 1 is a schematic diagram illustrating an environment in which embodiments of the invention can be applied.

FIG. 1 is a schematic diagram illustrating an environment in which embodiments of the invention can be applied.

A secure element 10 is in close proximity of a secure element reader 32. The secure element reader 32 can thus communicate with the secure element 10, using short range wireless communication, such as near field communication (NFC) or other equivalent communication.

This allows the secure element reader 32 to access a corresponding application instance 12 and secure data on the secure element 10. As one example, this communication can be used to ensure the holder of the secure element has a valid ticket, e.g. for public transportation. Another use case is payment, where the secure element can for example be used for credit/debit card payments, or direct reduction of a pre-paid credit stored within the secure element 10. Furthermore, this can enable access control e.g. to buildings, or tickets, e.g. for movies or other events. Also the secure element 10 can implement loyalty cards.

The secure element reader 32 communicates with an application instance 12 stored in the secure element 10. Each application instance 12 can have an application instance state 14 comprising data which can be particular to this application instance 12, which is thus connected to the current holder of the secure element 10. Each application instance 12 is an instance of an application, e.g. for public transportation or payment. Each application instance 12 has an application identifier which allows the reader 32 to communicate with the particular application instance. For example, the secure element 10 may house a public transportation application instance with an application identifier x and a payment application instance with an application identifier y. When the user carrying the secure element wishes to use public transportation, the user would place the secure element, e.g. included in a mobile communication terminal 5, in proximity to the secure element reader 32, which in this case would be operated by the public transportation company. The secure element reader 32 would then communicate over the wireless interface to the secure element 10 and request the corresponding application instance 12 of the application for the public transportation company using the application identifier x. The mobile communication terminal 5 is a device capable of hosting the secure element 10 and which is capable of setting up communicating with other entities, such as an application manager server 20. The mobile communication terminal 5 can for example be a mobile (cellular) phone, a personal digital assistant (PDA) or any suitable portable communication device such as a netbook computer or a laptop computer.

A reactive application management component 16 handles, as will be explained in more detail below, the situation where the secure element reader 32 attempts to communicate with an application which is absent on the secure element 10. A determiner 35 determines whether there are any matching user applications 12 when the secure element reader 32 sends a command to the secure element 10 for a particular user application 12. When there is a match, an invoker 36 invokes the matching user application. The determiner 35 and invoker 36 are modules which may be implemented using hardware and/or software.

The secure element 10 can communicate via a communication channel 30 with the application manager server 20. The communication channel 30 can be a communication channel which is implemented using the mobile communication terminal 5. For example, the communication channel 30 can be implemented using the bearer independent protocol (BIP) as defined in the ETSI standard TS 102.223 (version 8.3.0 at the time of filing this application) using the Internet Protocol (IP), or any other suitable communication protocol also using the Internet Protocol (IP), e.g. over conventional mobile data connection. Using BIP is especially relevant when the Secure Element is a Universal Integrated Circuit Card (UICC).

The application manager server 20 comprises a computer program product 23 in the form of storage, e.g. for storing applications that can be downloaded to the secure element 10 or application instance states for applications which have been removed from secure elements. Furthermore, there is a proactive application management component 22 in the application manager server 20. This can for example be a software module which, based on rules, pushes an application to be transferred to the secure element 10. For example, if it is determined, e.g. with the help of a location based service, that the secure element has moved, or is moving, from city A to city B, and if there is limited space on the secure element 10, the application instance 12 for a public transportation company of city A is removed from the secure element (but the application instance state 14 can be transferred to the application manager server 20 and stored in storage 23) and an application instance for a public transportation company in city B is loaded onto the secure element 10.

The application manager server 20 is also connected to one or more service provider servers 34, e.g. via a wide area network connection such as the Internet. The service provider server 34 is in contact with the secure element reader 32, e.g. via a wide area network, such as the Internet. To illustrate, e.g. in the public transport example, the service provider server 34 is one or more servers run by the public transport company which communicates with the secure element reader 32 to verify access to public transportation using application instances 12 running on secure elements 10. Each public transportation application instance 12 has its own application instance state 14 which can for example hold information about when a ticket or monthly pass was purchased and for how many zones. Other examples of entities being responsible for the service provider server 34 are a bank, an event ticket provider, a coupon issuing service, a frequent flyer service etc. Although only one service provider is shown in FIG. 1, several service providers can be connected to the application manager server 20.

Figure 2:
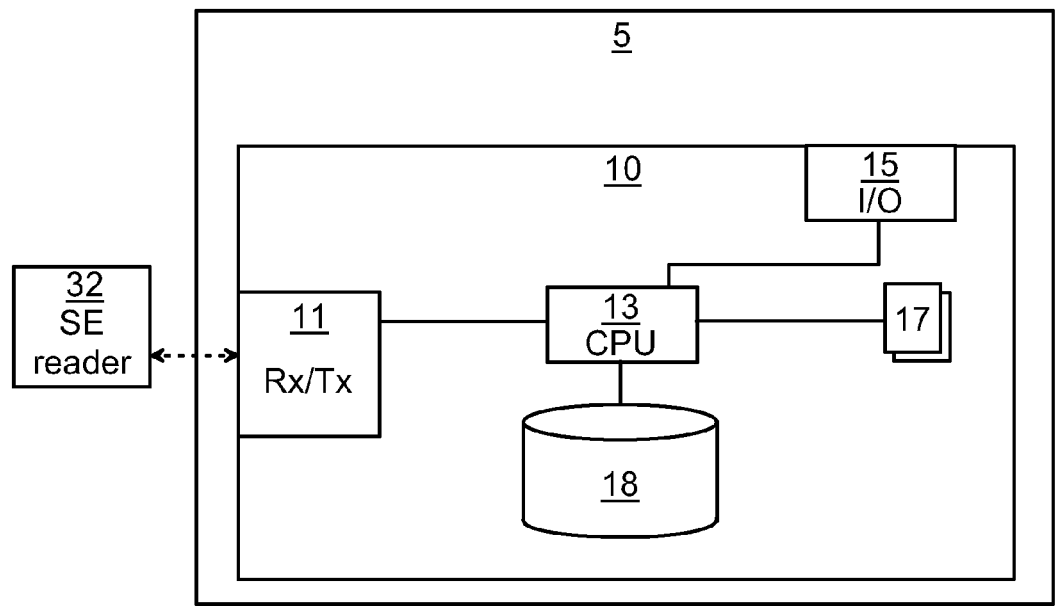
FIG. 2 is a schematic diagram showing a mobile communication terminal containing a secure element of FIG. 1.

FIG. 2 is a schematic diagram showing a mobile communication terminal 5 containing a secure element 10 of FIG. 1.

The secure element 10 comprises a controller 13 and a memory 18. The secure element has a physical structure which prevents third parties from reading or changing data in the memory 18, e.g. by being implemented using a smart card. Furthermore, applications running on the secure element are sufficiently separated to prevent one application monitoring another application. Also, the secure element 10 provides a structure with cryptographic functions enabling applications on the secure element to authenticate incoming user application commands as needed. As will be explained below, the authentication can be performed in advance on application level by the issuer of the secure element 10, whereby all operations of an authenticated application are allowed. The controller can be a central processing unit (CPU), a microcontroller or any other suitable electronic controller capable of executing software instructions. Memory resides in SE, contains support for an application to control authentication . . . . The memory 18 is a storage device where some or all write and/or read operations can be authenticated. The memory 18 can comprise one or more individual memory units. [end] The memory 18 can be a computer program product for executing methods described herein for the secure element 10 which for example can be implemented using JavaCard technology. A secure execution environment provides a method of executing applications in a way so that they are securely separated from a host environment of the mobile communication terminal 5. Often there is also integrated support from the secure execution environment to access parts of an attached memory 18, allocated for the application in question. There may also be one or more chip locations 17 for storing application instances and optionally application instance states. This can sometimes be necessary to support certain legacy technologies such as so called MIFARE Classic applications. The space on the secure element 10 is quite limited, so, as non-limiting examples, the secure element could be provided with 0, 1, 2, 4, or 8 chip locations. Furthermore, the memory 18 has a certain capacity, e.g. 64, 128 or 256 kilobytes. Of course, other capacities of the memory 18 are equally possible. The secure element 10 can be incorporated with the mobile communication terminal using different form factors, such as being a Universal Integrated Circuit Card (UICC), being directly embedded into the mobile communication terminal or being a microSD (micro secure digital) card inserted into the mobile communication terminal.

Examples of secure elements 10 are, but not limited to, secure elements conforming to global platform specifications (see http://www.globalplatform.org/ at the time of filing this patent application), TPM/MTM (Trusted Platform Module/Mobile Trusted Module) modules conforming to TCG specifications and ARM TrustZone enabled CPUs with attached secure memory. The party responsible for issuing the secure element 10, such as a telecom operator, can be responsible for authenticating application management on the secure element 10. For example, application installation can require a digital signature from the secure element issuer. Alternatively or additionally, individual commands to the application can be signed or encrypted. The secure element has, to enable the previously mentioned cryptographic functions, access to digital keys, e.g. stored in memory 18, that are used to verify the authenticity of the commands, by verifying the signature accompanying the command or by decrypting the command. Once the application is installed, it is thus authenticated and its operations on the memory 18 are authenticated through the application authentication. Each application can decide what commands are to require authentication. In other words, the application can decide to require that all, none or some commands to the application are to be authenticated.

Typically there is also a need for communication with the secure element 10. This communication can be done with an application running in the secure execution environment of the secure element 10 and/or with the memory directly. An example of such a communication protocol is, but not limited to, APDU (Application Protocol Data Unit) based protocols defined in ISO 7816-4. The communication can occur through an I/O port 15 to the mobile communication terminal 5, or through a transceiver (transmitter & receiver) 11 for communicating with the secure element reader 32. The communication between the transceiver 11 and the secure element reader 32 can for example occur based on the ISO/IEC 14443 Type A 13.56 MHz contactless communication standard. Other near field communication standards are equally possible.

As previously explained, the mobile communication terminal 5 can be any suitable device capable of hosting and communicating with the secure element 10 and capable of communicating with the application manager server 20. Optionally, the mobile communication terminal 5 comprises an antenna (not shown) for facilitating communication between the secure element 10 and the secure element reader 32. For example, the host device can be a mobile phone (cellular phone) or personal digital assistant (PDA), or a dedicated near field communication (NFC) device.

Figure 3:
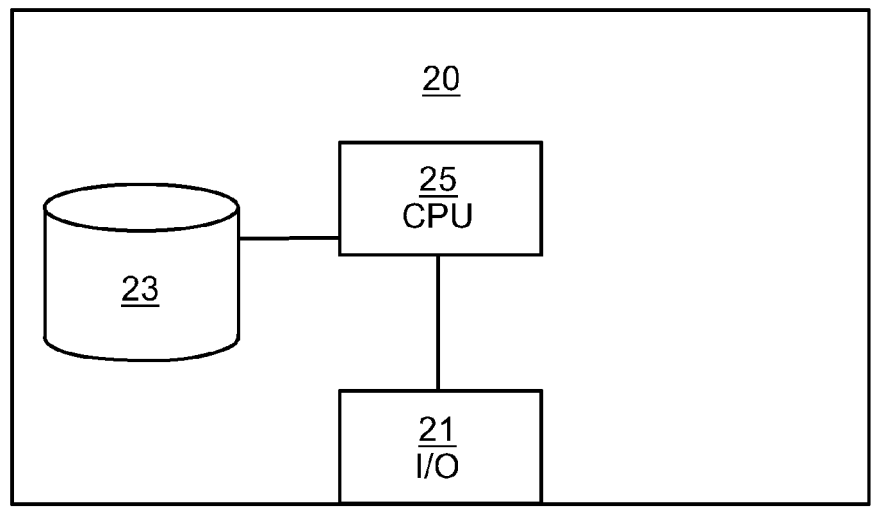
FIG. 3 is a schematic diagram showing an application manager server of FIG. 1.

FIG. 3 is a schematic diagram showing an application manager server 20 of FIG. 1. The application manager server 20 can be any suitable computer capable of performing the tasks as described herein. For example, the server can be a computer running an operating system such as Linux, Microsoft Windows, Apple Mac OS, UNIX variants, etc. can be used. The server comprises a processor 25 (e.g. a CPU), memory 23 comprising primary memory, such a RAM and secondary memory being persistent storage, such as magnetic storage, solid state storage, optical storage or any combination of these. The server also comprises I/O ports 21 e.g. for wide area network connections to the secure element 10 and to the service provider server 34.

Figure 4:
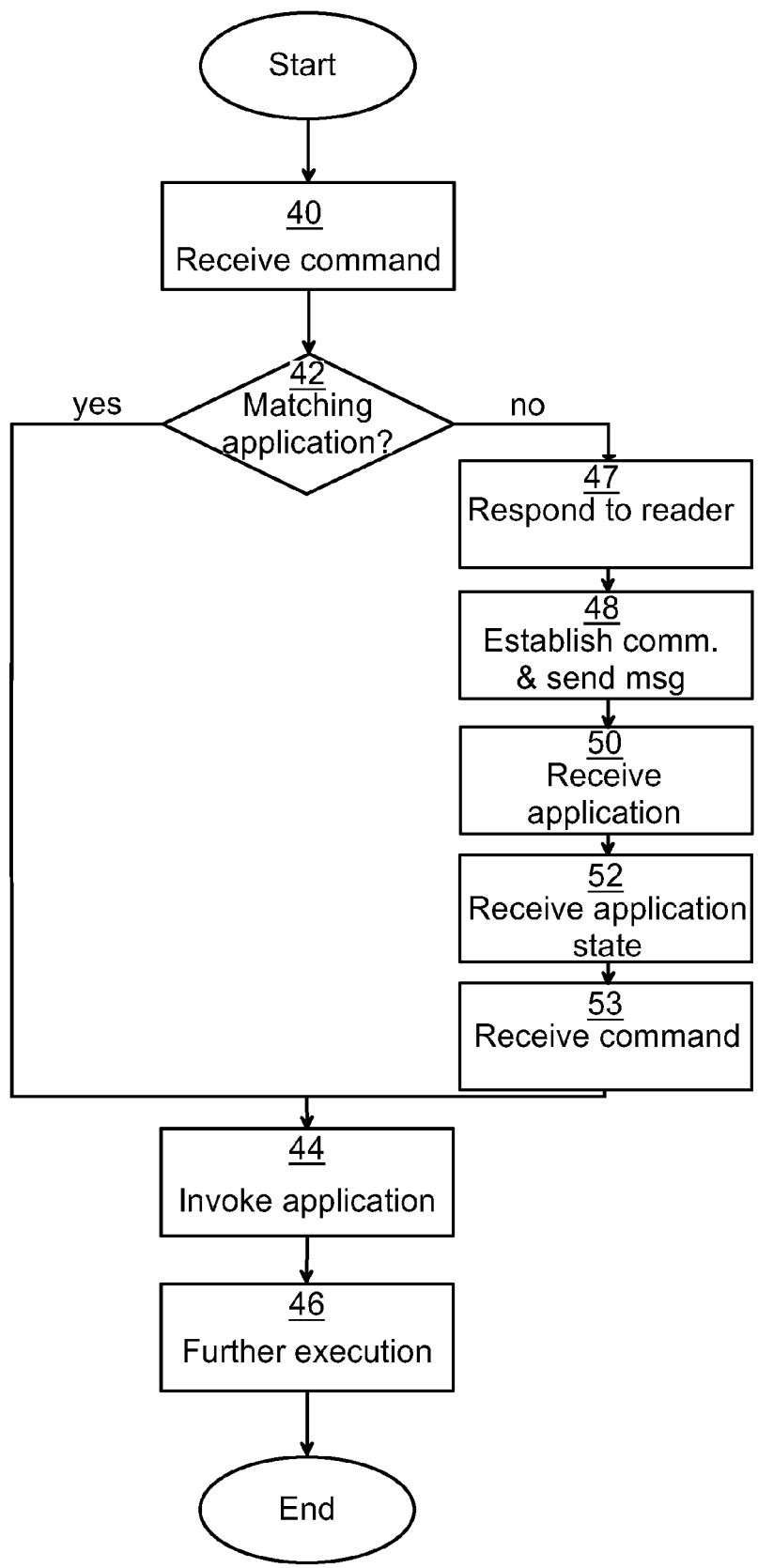
FIG. 4 is a flow chart illustrating a method performed in a secure element of FIG. 1.

FIG. 4 is a flow chart illustrating a method performed in the secure element 10 of FIG. 1 to handle absent applications.

In an initial receive command step 40, a command is received from the secure element reader 32. The command comprises an application identifier indicating that the secure element reader 32 wants to come in communication with a specific application instance 12 with an application identifier matching the application identifier of the command.

In a conditional matching application step 42, it is determined whether there is a user application in the secure element 10 which matches the given application identifier. User application here denotes any application of the secure element 10 which is used by the user to achieve something, such as the tickets, access controls, payments, etc. described above. Each user application is coupled to one or more application identifiers. There can also be internal applications, as will be explained below, which can be coupled to application identifiers. If there is a matching user application, the method continues to an invoke application step 44. Otherwise, if there is no matching user application, the method continues to a respond to reader step 47.

In the respond to reader step 47, the secure element responds to the secure element reader that the requested application is not available on the secure element. This allows the reader to end the current process and wait to be initiated again.

In an establish communication and send message step 48, an internal application coupled to the application identifier is invoked. The internal application establishes a communication channel 30 (FIG. 1) to the application manager server 20 via the mobile communication terminal 5 and sends a message to the application manager server 20 that an application with the specific application identifier was requested on the secure element 10. The message contains an identifier of the application, which may be the same as the identifier supplied by the secure element reader or a derived identifier. Moreover, the message contains an identifier coupled to the secure element. The application manager server 20 received the message and sends a matching application to the secure element 10.

Alternatively, step 48 can be performed as part of the operating system of the secure element 10. In other words, the step does not need to be performed in an internal application.

In a receive application step 50, the matching application is received from the application manager server 20 and is stored as an application instance in the memory 18 of the secure element 10.

In an optional receive application state step 52, a message is received comprising state data of the received application from when the received application was most recently executed. In the public transport example, the state data can for example be monthly pass data in terms of validity dates and zones. This allows application instances to be temporarily removed from the memory 18 of the secure element 10 and reinstated as if nothing has happened, since upon removal, the most recent application instance state 14 is sent to the application manager server 20 and is stored for when the application instance 12 is reloaded.

Once the application is loaded as an application instance 12 in the memory 18, the user can initiate a new command from the secure element reader, whereby another receive command step 53 is performed, where the secure element 10 receives a command from the secure element reader to communicate with the application. The method then continues to the invoke application step 44.

In the invoke application step 44, the application matching the application identifier is invoked.

In a further execution step 46, further communication between the secure element 10 and the secure element reader 32 is effected and the application instance is executed as expected, as is known per se.

Figure 5:
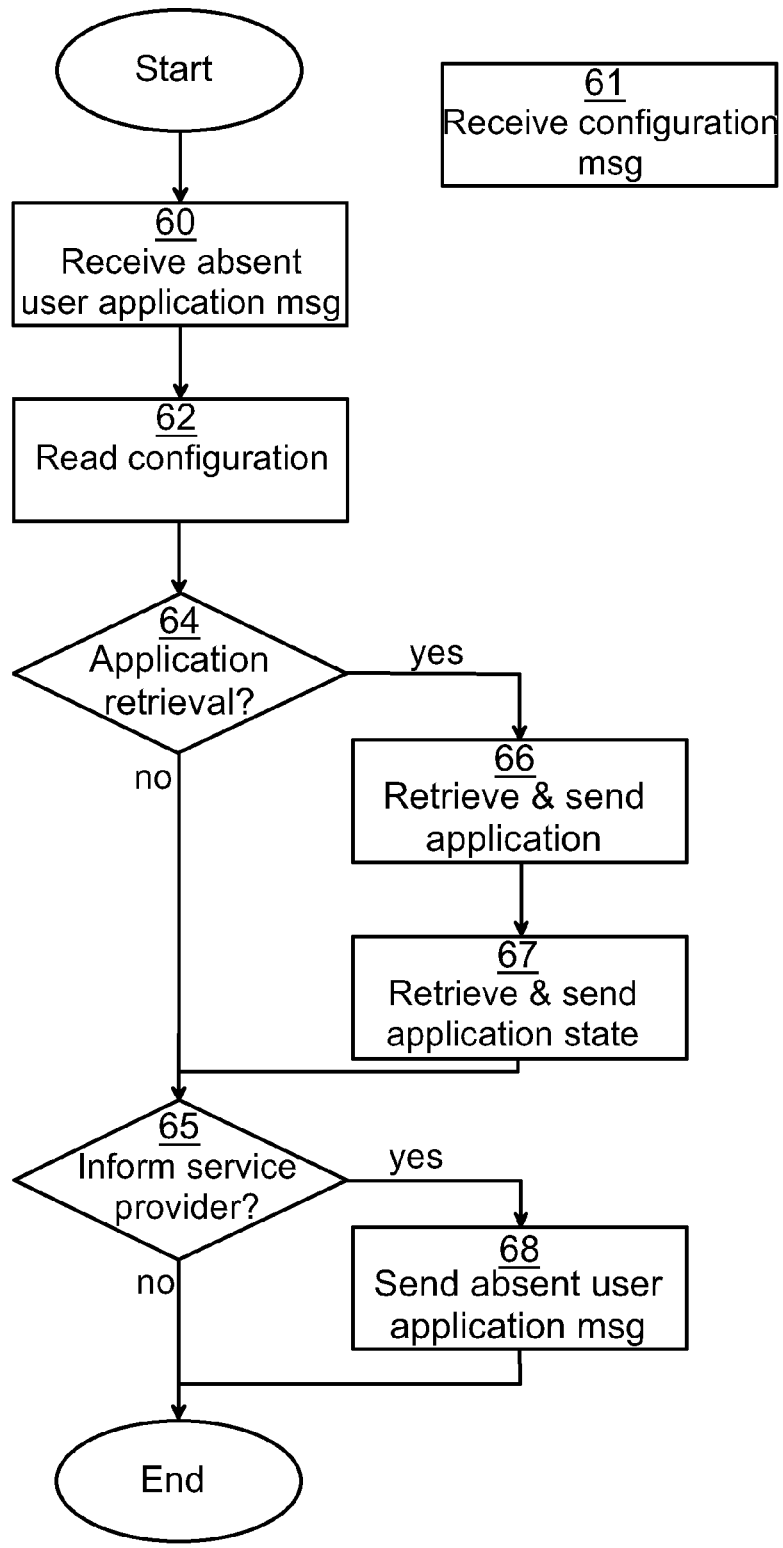
FIG. 5 is a flow chart illustrating a method performed in the application manager server of FIG. 1.

FIG. 5 is a flow chart illustrating a method performed in the application manager server 20 of FIG. 1. The method is performed in the application manager server in order to respond to absent user applications. A step 61 to receive a configuration message has optionally been performed prior to this method being started. The configuration message is then received from the service provider 34 (FIG. 1) with indications on how the application manager server should handle absent user applications on secure elements.

In an initial receive absent user application message step 60, a message is received from the secure element that there are no user applications in the secure element corresponding to an application identifier supplied by a secure element reader. The received message corresponds to the message sent in step 48 in FIG. 4.

In a read configuration step 62, the application manager server reads configuration, e.g. from storage 23 of FIG. 3. The configuration can for example be accessed based on application or user (or user group) or a combination of these. There may even be a hierarchical configuration where more precise configuration has a higher priority.

Once a configuration item has been determined, the method checks, in a conditional retrieval step 64, the configuration item whether the missing application should be transferred to the secure element identified in the absent user application message. If it is determined that the missing application is to be retrieved, the method continues to a retrieve and send application step 66. On the other hand, if it is determined that the missing application is not to be retrieved, the method continues to a conditional inform service provider step 65.

In the retrieve and send application step 66, the method retrieves the missing application from memory, e.g. memory 23 of FIG. 3. The application is sent to the secure element, identified in the absent user application message, to enable the secure element to create an instance of the application in the memory 18 of the secure element 10.

In an optional retrieve and send application state step 67, state data of the received application from when the received application was most recently executed in the secure element is retrieved. This application instance state data is for example stored in the memory 23 of FIG. 3. The state data is then sent to the secure element.

It is to be noted that application and state retrieval can be performed prior to any of the messages of steps 66 and 67 are sent.

In the conditional inform service provider step 65, it is determined from the configuration item if the service provider associated with the absent application is to be informed. If it is determined that the service provider associated with the absent application is to be informed, the method continues to a send absent user application message step 68. On the other hand, if it is determined that the service provider associated with the absent application is not to be informed, the method ends.

In the send absent user application message step 68, a message is sent to the service provider associated with the user application which is absent in the secure element. The message sent to the service provider does not need to be, but can be, an exact copy of the absent user application message which is received in step 60. This can enable, for example, the service provider to contact the mobile communication terminal 5 (FIG. 2) housing the secure element with a web link presenting the user with various options on how to proceed, which is explained in further detail below.

Figure 6A:
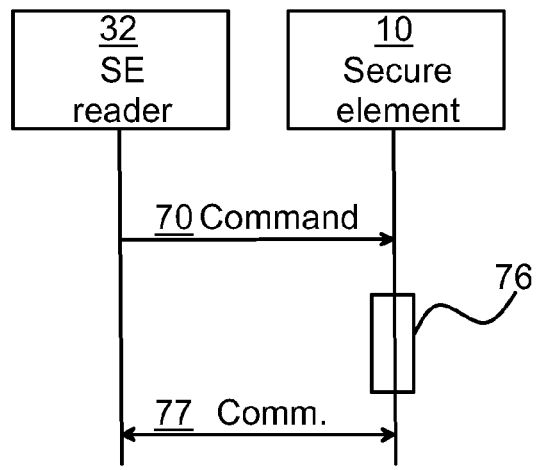
FIG. 6A is a sequence diagram illustrating communication when the requested application is present on the secure element.

FIG. 6A is a sequence diagram illustrating communication when the requested application is present on the secure element 10. This is a very simple sequence diagram illustrating the case which is known from the prior art per se, when the application which is requested by the secure element reader 32 is present on the secure element 10.

First, a command 70 is sent from the secure element reader 32 to the secure element 10. The command is an initial message to invoke and access a specific application, identified by an application identifier, on the secure element.

The secure element 10 finds 76 an application instance matching the specific application, whereby the secure element reader 32 and the secure element 10 can communicate 77 as necessary to provide the intended function.

Figure 6B:
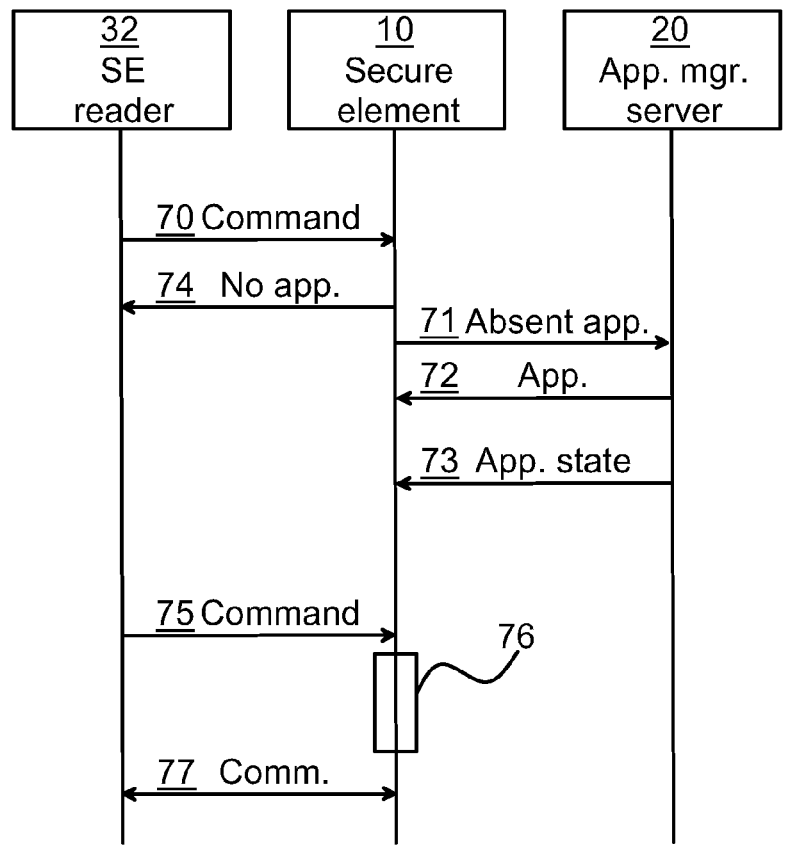
FIG. 6B is a sequence diagram illustrating communication when the requested application is absent on the secure element and the absent application is provided from the application manager server.

FIG. 6B is a sequence diagram illustrating communication when the requested application is absent on the secure element and the absent application is provided from the application manager server.

First, a command 70 is sent from the secure element reader 32 to the secure element 10. The command is an initial message to invoke and access a specific application, identified by an application identifier, on the secure element.

However, in this case, there is no application instance on the secure element 10 which matches the provided application identifier. The secure element 10 first responds with a negative response 74 to the secure element reader 32 that the requested application is not available on the secure element.

The secure element 10 then sends an absent user application message 71 to the application manager server 20. The application manager server 20 responds by sending the application 72 in question and optionally an application instance state 73.

The user can then attempt again to start new command 75 from the secure element reader 32.

The secure element 10 then continues as if the application has been installed from the beginning and invokes 76 the application and communicates 77 with the secure element reader 32.

Figure 6C:
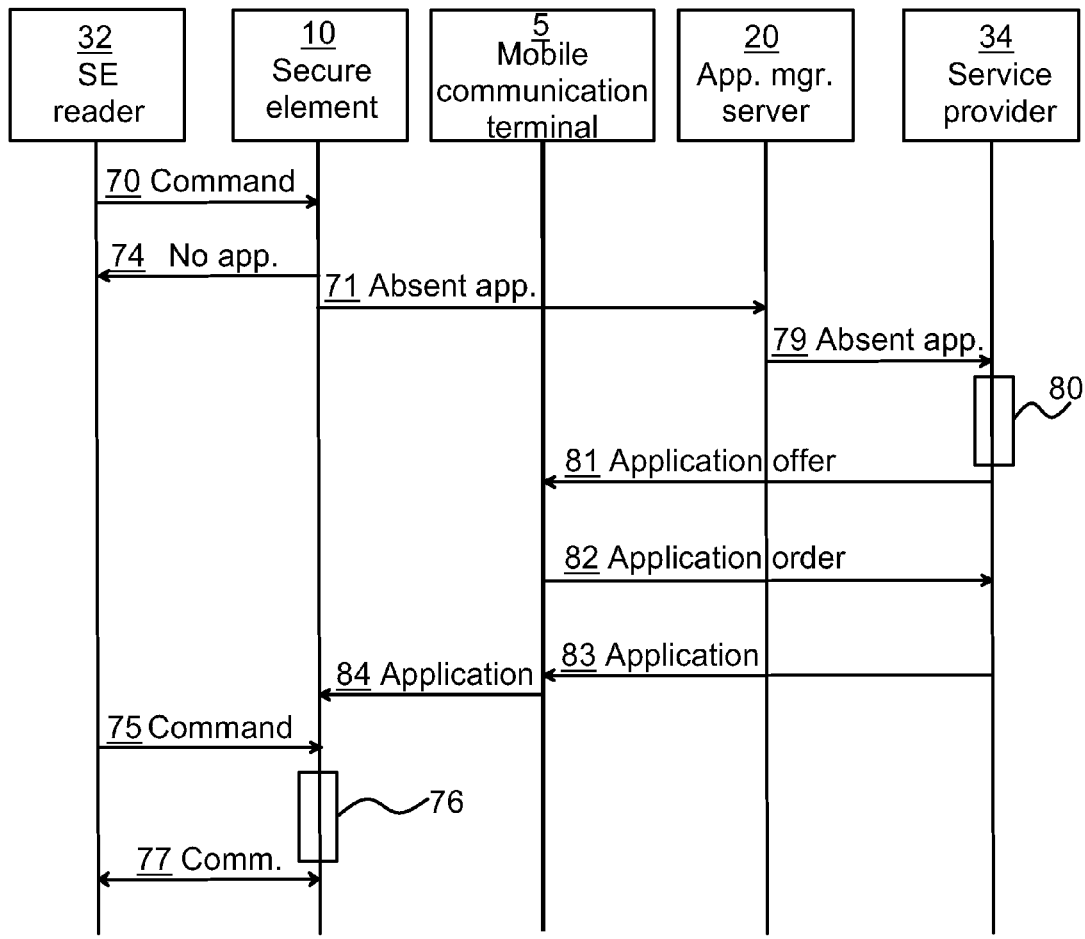
FIG. 6C is a sequence diagram illustrating communication when the requested application is absent on the secure element and the service provider is notified of the absent application.

FIG. 6C is a sequence diagram illustrating communication when the requested application is absent on the secure element and the service provider is notified of the absent application.

First, a command 70 is sent from the secure element reader 32 to the secure element 10. The command is an initial message to invoke and access a specific application, identified by an application identifier, on the secure element.

Here, there is no application instance on the secure element 10 which matches the provided application identifier. The secure element 10 first responds with a negative response 74 to the secure element reader 32 that the requested application is not on the secure element.

The secure element 10 then sends an absent user application message 71 to the application manager server 20. The application manager server 20 then sends an absent user application message 79 to the service provider server 34.

The service provider server 34 can process 80 this message accordingly. In this example, the service provider server 34 responds by sending an application offer 81 to the mobile communication terminal 5. This can for example be a web link presenting the user with various options on how to proceed. This allows the user to interact, using a web interface, with the service provider server 34. This can result in an application order 82, such as a public transportation application. The service provider server 34 then sends a corresponding application 83 to the mobile communication terminal 5 which forwards the application 84 to the secure element, optionally with initial application instance state data, e.g. a public transportation monthly pass with validity dates and valid zones.

The user can then attempt again to start new command 75 from the secure element reader 32.

The secure element 10 then continues as if the application has been installed from the beginning and invokes 76 the application and communicates 77 with the secure element reader 32. Possibly, due to the time taken in the order process, the user may have to trigger a new command 70 from the secure element reader 32 to allow interaction, or communication, 77 between the secure element reader 32 and the secure element 10 to commence properly. The new command can for example be triggered by placing the secure element in close proximity to the secure element reader 32.

Figure 7:
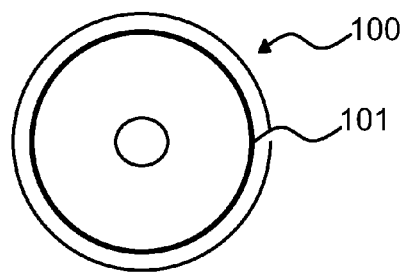
FIG. 7 shows one example of a computer program product comprising computer readable means and a computer program thereon.

FIG. 7 shows one example of a computer program product 100 comprising computer readable means. On this computer readable means a computer program 101 can be stored, which computer program can cause a controller to execute the method according to embodiments described herein. In this example, the computer program product is an optical disc, such as a CD (compact disc) or a DVD (digital versatile disc). As explained above, the computer program product could also be embodied as a memory of a device, such as memory 18 of the secure element 10 or memory 23 of the application manager server 20. While the computer program 101 is here schematically shown as a track on the depicted optical disk, the computer program can be stored in any way which is suitable for the computer program product.

Now it will be disclosed in some more detail, with reference to FIG. 1, how application state data is managed when the secure element conforms to the global platform standard.

Firstly, it will be explained how application instance state management is performed without extensions to the global platform standards.

Regarding the application installation and deletion, applications according to the global platform standard are stored in so called cap files. These files are installed to the secure element 10 (thus creating an application instance 12) by generating APDUs based on the cap file and sending these APDUs to the secure element 10. In the same manner, an application instance 12 can be deleted by sending a set of well formed APDUs to the secure element 10.

While application instantiation is nothing new to global platform, the concept of extracting the application instance state is. Therefore, there is currently no method available within the global platform framework of specifications. It will now be disclosed one possible scheme for how this can be achieved.

When the application instance state 14 is to be stored, the application instance 12 is made aware that it may be deleted and that its state thus needs to be stored. This will be achieved by defining a Command APDU message that informs the application instance 12 that its state needs to be stored. The application instance 12 will send a Response APDU with its state 14 as a response to this Command APDU. Since APDUs are small (250 Bytes at a maximum) there might be a need to do this several times. It is therefore proposed that the Command APDU has its P1 (parameter 1) and P2 (parameter 2) bytes combined into a two octet field that works as a message identifier. Every Command APDU sent to an application instance, part of the same application state extraction procedure, from the AISF should have a unique value set to this field of the combined P1 and P2. This gives a possibility for the application instance to respond to 2^16 application state extraction messages, which should be more than enough for storing its internal state. One way of generating the message identifier would be to increase it with one for every message sent. The application instance should respond with the SW1 (status word 1) and SW2 (status word 2) set to different values depending on whether all of its application state have been sent or not. In one embodiment, the hexadecimal value of "9000" should be use for indicating that all data was sent, which corresponds to the global platform Status OK. The exact value for the SW1 and SW2 bytes for the other case, that there is still more data to be sent, can be set to other appropriately defined values.

Secondly, it will be explained how application instance state management is performed with appropriate extensions to the global platform standards.

In global platform, the application instance state 14 can consist of all the variables declared in the base class of the application 12. This fact could be exploited in a way so that these variables could be saved and restored with global platform instructions. Such commands would be used to restore the application instance state 14 after an application is installed and to retrieve the application instance state 14 before an application instance 12 is removed. The actual implementation of these instructions is outside the scope of this document, but they could be very similar to the already existing INSTALL and LOAD instructions of the global platform standard.

The invention has mainly been described above with reference to a few embodiments. However, as is readily appreciated by a person skilled in the art, other embodiments than the ones disclosed above are equally possible within the scope of the invention.

The invention claimed is:

1. A method, performed in a secure element, the secure element configured to enable user applications of the secure element to verify authenticity of incoming user application commands, and the secure element comprised in a mobile communication terminal, the method comprising:
   receiving a command from a secure element reader for a user application on the secure element, the command comprising an application identifier of the user application;
   determining whether there is a matching user application in the secure element, the matching user application having an identifier that matches the application identifier;
   invoking, in response to there being a matching user application, the matching user application based on the received command;
   establishing, in response to there being an absence of any matching user application, a communication channel with a remote application manager server and sending an absent user application message to the application manager server indicating that the user application has been requested on the secure element, the absent user application message including the application identifier of the absent user application and a terminal identifier corresponding to the mobile communication terminal;
   receiving, when there is an absence of any matching user application in the secure element, the user application from the application manager server, the received user application being sent from the application manager server in response to the absent user application message;
   receiving, from the application manager server, an application instance state of the user application received from the application manager server, the application instance state comprises state data of the received user application from when the received application was most recently executed in the secure element; and
   invoking, upon receiving the user application from the application manager server, the received user application.

2. The method of claim 1:
   wherein establishing the communication channel and sending the absent user application message comprises establishing the communication channel and sending the absent user application message using an internal application stored in a memory;
   wherein the internal application has an association with the application identifier.

3. The method of claim 1 wherein establishing the communication channel comprises establishing the communication channel using Bearer Independent Protocol.

4. A secure element configured to enable user applications of the secure element to verify authenticity of incoming user application commands, wherein the secure element is comprised in a mobile communication terminal, the secure element comprising:
   a receiver configured to receive a command from a secure element reader for a user application on the secure element, the command comprising an application identifier of the user application;
   a determiner circuit configured to determine whether there is a matching user application in the secure element, the matching user application having an identifier that matches the application identifier;
   an invoker circuit configured to invoke, in response to there being a matching user application, the matching user application based on the received command;
   a transmitter arranged to establish, in response to there being an absence of any matching user application, a communication channel with a remote application manager server and send an absent user application message to the application manager server indicating that the user application has been requested on the secure element, the absent user application message including the application identifier of the absent user application and a terminal identifier corresponding to the mobile communication terminal,
   wherein the receiver is further configured to receive, when there is an absence of any matching user application in the secure element, the user application and an application instance state of the received user application from the application manager server, the received user application being sent from the application manager server in response to the absent user application message and the application instance state of the user application received from the application manager server comprises state data of the received user application from when the received user application was most recently executed in the secure element,
   wherein the invoker circuit is further configured to invoke, upon receiving the user application from the application manager server, the received user application.

5. A computer program product stored in a non-transient computer readable medium and executable in a controller with access to a secure element configured to enable user applications of the secure element to verify authenticity of incoming user application commands, the secure element comprised in a mobile communication terminal, the computer program product comprising software code instructions which, when run on the controller, causes the controller to:

receive a command from a secure element reader for a user application on the secure element, the command comprising an application identifier of the user application;

determine whether there is a matching user application in the secure element, the matching user application having an identifier that matches the application identifier;

invoke, in response to there being a matching user application, the matching user application based on the received command;

establish, in response to there being an absence of any matching user applications, a communication channel with a remote application manager server and send an absent user application message to the application manager server indicating that the user application has been requested on the secure element, the absent user application message including the application identifier of the absent user application and a terminal identifier corresponding to the mobile communication terminal;

receive, when there is an absence of any matching user applications in the secure element, the user application from the application manager server, the received user application being sent from the application manager server in response to the absent user application message;

receive, from the application manager server, an application instance state of the user application received from the application manager server, the application instance state comprises state data of the received user application from when the received user application was most recently executed in the secure element; and invoke, upon receiving the user application from the application manager server, the received user application.

* * * * *